UNITED STATES PATENT OFFICE.

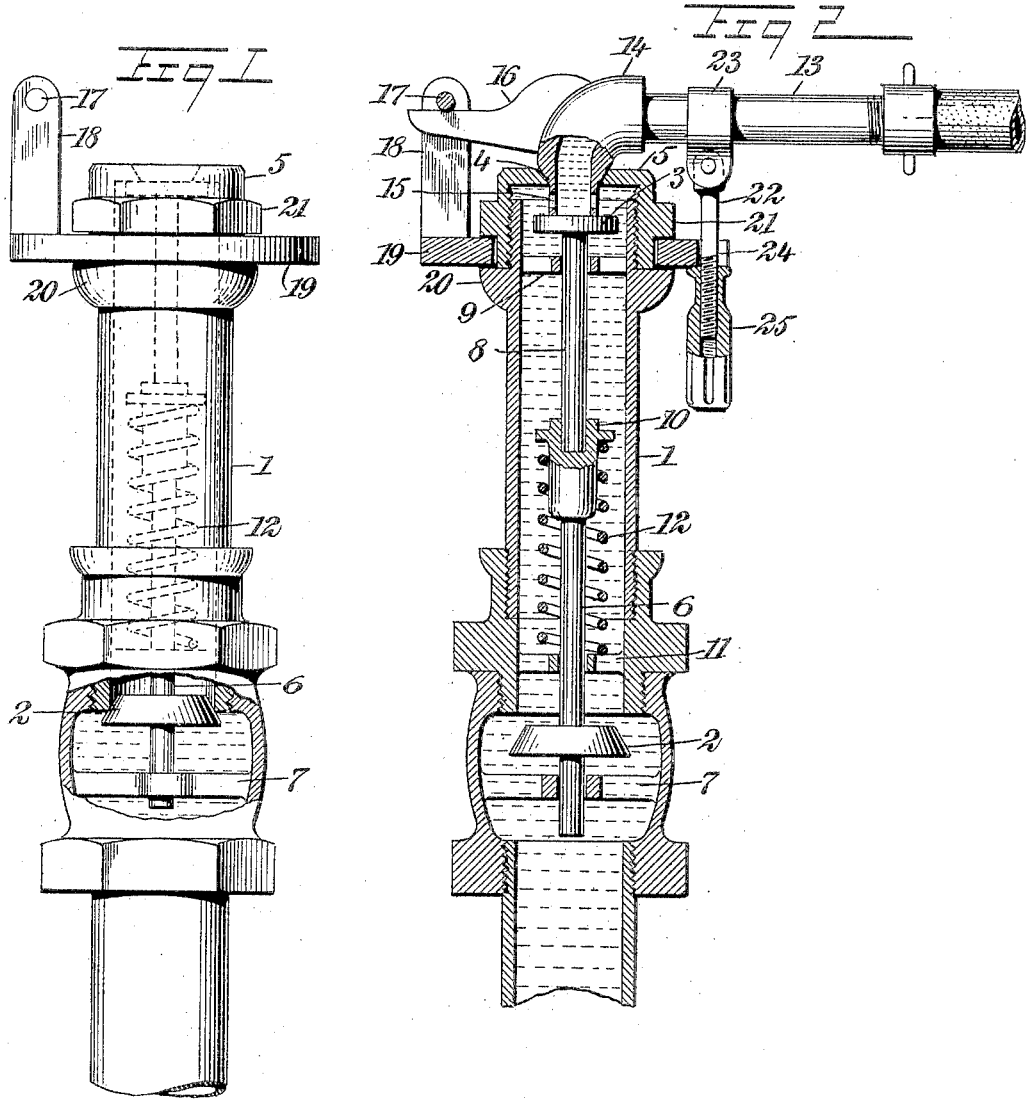

WILLIAM REYNOLDS THURSTON, OF JACKSONVILLE, FLORIDA.

HYDRANT AND HOSE COUPLING.

No. 797,384.        Specification of Letters Patent.        Patented Aug. 15, 1905.

Application filed September 16, 1904. Serial No. 224,667.

*To all whom it may concern:*

Be it known that I, WILLIAM REYNOLDS THURSTON, a citizen of the United States, and a resident of Jacksonville, in the county of Duval and State of Florida, have invented a new and Improved Hydrant and Hose Coupling, of which the following is a full, clear, and exact description.

This invention relates to improvements in couplings for connecting a fire-hose or the like to a hydrant, the object being to provide a simple and novel mechanism whereby a hose may be quickly connected to a hydrant and practically in instantaneous use, the parts being so constructed that the hose may be turned in any desired direction with relation to the hydrant.

Other objects of the invention will appear in the general description.

I will describe a hydrant and hose coupling embodying my invention and then point out the novel features in the appended claims.

Reference is to be had to the accompanying drawings, forming a part of this specification, in which similar characters of reference indicate corresponding parts in all the figures.

Figure 1 is an elevation of a hydrant, showing a part of the coupling embodying my invention. Fig. 2 is a sectional elevation illustrating the complete coupling, and Fig. 3 is a plan view.

Referring to the drawings, 1 designates a hydrant in which is arranged a valve 2 for closing the lower end, and also a valve 3 is provided for closing an opening 4 in the upper end of the hydrant. As here shown, this opening 4 is formed in a cap 5, having screw-thread engagement with the hydrant. The valve 2 is connected to a stem 6, guided at its lower end or below the valve 2 in a cross-bar 7, and the valve 3 has a stem 8, guided in a cross-bar 9 and engaging at its lower end in a socket member 10, connected to the stem 6. The said stem 6 above the valve 2 is movable through a cross-bar 11, and between this cross-bar 11 and a flange on the socket member 10 is a spring 12, which normally holds the valves in their closed position. A hose-connecting pipe 13 has a downwardly-turned or elbow portion 14, designed to be passed through the opening 4 and rotate therein, and this downwardly-extended portion has ports 15 for the outlet of water. The elbow is provided with an outwardly-extended arm 16, designed to engage with a fulcrum-pin 17, attached to standards 18, extended upward from a ring 19, mounted to rotate on the hydrant. As here shown, the ring 19 is engaged between an annular flange 20, formed integral with the hydrant-body, and with an annular flange 21 on the cap 5.

A locking device for the hose-connecting pipe consists of a rod 22, pivoted to a collar 23 on said pipe 13, the said rod 22 being adapted to pass into a notch 24, formed in the ring 19. A handle 25 has screw-thread engagement with the rod 22, so that when said rod is passed into the notch 24 the handle may be screwed tightly up against the side of the ring and hold the parts in connection.

It will be noted that the wall of the opening 4 is tapered and that the portion of the elbow 14 engaging therewith is correspondingly shaped, so that a water-tight connection is formed when the parts are locked together. While I have shown but one pipe 13 connected with the elbow, it is obvious that more pipes may be connected therewith.

In operation when it is desired to connect the hose with a hydrant the arm 16 is to be engaged underneath the fulcrum-pin 17 and the end of the elbow 14 engaged with the valve 3, then by pressing the pipe 13 downward the two valves will be moved to open position, after which the locking device may be adjusted.

It will be seen that by my invention a hose may be much more readily attached to a hydrant than with the ordinary connections of screw-thread couplings.

Having thus described my invention, I claim as new and desire to secure by Letters Patent—

1. A hydrant having an outlet-opening, a valve for said opening, a hose-connection pipe having a downwardly-turned end provided with lateral ports, the said end being adapted to pass through the outlet-opening of the hydrant and to rotate therein, a part mounted to rotate on the hydrant, and means for locking the hose-connection pipe to said rotary part.

2. A hydrant having an outlet-opening at its top, spring-pressed valves for closing said outlet-opening and also for closing the lower portion of the hydrant, a hose-connection pipe having a ported portion for passing through the outlet-opening and to engage with the upper valve, a ring mounted to rotate on the hydrant, a fulcrum carried by said ring, an arm extended from the hose-connection pipe for engaging with said fulcrum, and a locking device for securing said pipe to said ring.

3. A hydrant having an outlet-opening at the top, a valve for controlling said opening, a spring for holding the valve normally in closed position, a ring mounted to rotate on the hydrant, posts extended upward from the ring, a fulcrum-pin attached to said posts, the said ring being provided at one side with a notch, a hose-connection pipe having a ported portion for extending through the outlet of the hydrant and engaging with the said valve, an arm on said pipe for engaging with the fulcrum-pin, a locking-rod mounted to swing on the pipe and adapted to engage in the notch in said ring and a handle having screw-thread engagement with the rod.

4. A hydrant having an annular shoulder at its upper end, a cap having a screw-thread engagement with the hydrant above the shoulder, an annular flange on said cap, a ring engaging between said flange and shoulder, the said cap being provided with an outlet-opening, a valve for controlling the said opening, a hose-attaching pipe having a ported portion for extending through said opening, and adapted to force the valve downward, an arm extended from said pipe, a fulcrum carried by the ring for engaging with said arm, and means for locking the pipe in engagement with the ring.

5. A hydrant having an outlet-opening, a valve for said opening, a hose-connection pipe adapted to pass through the hydrant outlet-opening and to rotate therein, a part mounted to rotate on the hydrant, and means for locking the hose-connection pipe to said rotary part.

In testimony whereof I have signed my name to this specification in the presence of two subscribing witnesses.

WILLIAM REYNOLDS THURSTON.

Witnesses:
J. E. BUTTS,
JAMES STEWART.